United States Patent
Pramod et al.

(10) Patent No.: US 11,203,379 B2
(45) Date of Patent: Dec. 21, 2021

(54) CASCADED POSITION CONTROL ARCHITECTURE FOR STEERING SYSTEMS

(71) Applicant: STEERING SOLUTIONS IP HOLDING CORPORATION, Saginaw, MI (US)

(72) Inventors: Prerit Pramod, Saginaw, MI (US); Kai Zheng, Midland, MI (US); Mariam Swetha George, Midland, MI (US); Tejas M. Varunjikar, Troy, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/376,122

(22) Filed: Apr. 5, 2019

(65) Prior Publication Data
US 2019/0308664 A1    Oct. 10, 2019

Related U.S. Application Data

(60) Provisional application No. 62/653,065, filed on Apr. 5, 2018.

(51) Int. Cl.
*B62D 15/02*    (2006.01)
*G01L 5/22*    (2006.01)
(Continued)

(52) U.S. Cl.
CPC ....... *B62D 15/0225* (2013.01); *B62D 15/025* (2013.01); *B62D 6/008* (2013.01); *B62D 6/10* (2013.01); *G01L 5/22* (2013.01)

(58) Field of Classification Search
None
See application file for complete search history.

(56) References Cited

U.S. PATENT DOCUMENTS

| | | | |
|---|---|---|---|
| 2009/0192665 A1 | 7/2009 | Nozawa | |
| 2013/0018550 A1 | 1/2013 | Kim | |
| (Continued) | | | |

FOREIGN PATENT DOCUMENTS

| | | |
|---|---|---|
| CN | 102837736 A | 12/2012 |
| CN | 104583056 A | 4/2015 |
| CN | 106573647 A | 4/2017 |

OTHER PUBLICATIONS

Chinese Office Action and Search Report from the Chinese Patent Office for corresponding Chinese Patent Application No. 201910276998.0 dated Apr. 19, 2021, 10 pages.

*Primary Examiner* — Yuen Wong
*Assistant Examiner* — Hongye Liang
(74) *Attorney, Agent, or Firm* — Dickinson Wright PLLC

(57) ABSTRACT

Technical solutions are described for disturbance feedforward compensation technique for improving the disturbance rejection properties of a closed loop position control system using a cascaded control structure with an inner velocity and outer position control loops. According to one or more embodiments, a system includes a position controller that receives an input rack-position command, and a measured rack-position, and computes a velocity command based on a difference in the input rack-position command and the measured rack-position. The system further includes a velocity controller that receives the velocity command, and a measured motor velocity, and computes an input torque command based on a difference in the velocity command and the measured motor velocity. The system adjusts a position of a rack by generating an amount of torque corresponding to the applying the input torque command to a motor.

19 Claims, 6 Drawing Sheets

(51) Int. Cl.
*B62D 6/00* (2006.01)
*B62D 6/10* (2006.01)
*B62D 5/04* (2006.01)

(56) References Cited

U.S. PATENT DOCUMENTS

2018/0334184 A1* 11/2018 Jin ..................... B62D 5/0463
2020/0108857 A1* 4/2020 Tsubaki ................ B62D 6/00

* cited by examiner

CASCADED POSITION CONTROL ARCHITECTURE FOR STEERING SYSTEMS

CROSS-REFERENCES TO RELATED APPLICATIONS

This patent application claims priority to U.S. Provisional Patent Application Ser. No. 62/653,065, filed Apr. 5, 2018, and which is incorporated herein by reference in its entirety.

BACKGROUND

The present application generally relates to steering systems, and particularly addresses technical challenges related to position control in steering systems using a cascaded position control architecture.

Steering systems used by vehicles can include a position controller that positions a rack according to a position command. Examples of steering systems including such position controller can include a steer by wire system (SbW) that includes a road-wheel actuator (RWA), an electric power steering system (EPS), and the like. The position command can be received by the position controller from a human driver or an autonomous driver, such as in an advanced driving assistance system (ADAS).

SUMMARY

Technical solutions are described for disturbance feedforward compensation technique for improving the disturbance rejection properties of a closed loop position control system using a cascaded control structure with an inner velocity and outer position control loops. According to one or more embodiments, a system includes a position controller that receives an input rack-position command, and a measured rack-position, and computes a velocity command based on a difference in the input rack-position command and the measured rack-position. The system further includes a velocity controller that receives the velocity command, and a measured motor velocity, and computes an input torque command based on a difference in the velocity command and the measured motor velocity. The system adjusts a position of a rack by generating an amount of torque corresponding to the applying the input torque command to a motor.

According to one or more embodiments, a method includes computing, by a position controller, a velocity command based on a difference in an input rack-position command and a measured rack-position that is provided as a first feedback term. The method further includes computing, by a velocity controller, an input torque command based on a difference in the velocity command and a measured motor velocity that is provided as a second feedback term, the velocity controller forming a cascaded control loop with the position controller for providing rack position tracking. The method further includes adjusting, by a motor, a position of a rack by generating an amount of torque corresponding to the input torque command.

According to one or more embodiments, a steering system includes a motor, a rack, and a plurality of controllers that includes a position controller and a velocity controller. The controllers perform a method for providing a rack position tracking using a cascaded control loop comprising a velocity feedback loop and a position feedback loop. The method includes computing, by the position controller, a velocity command based on a difference in an input rack-position command and a measured rack-position that is provided as a first feedback term. The method further includes computing, by the velocity controller, an input torque command based on a difference in the velocity command and a measured motor velocity that is provided as a second feedback term, the velocity controller forming a cascaded control loop with the position controller for providing rack position tracking. The method further includes adjusting, by a motor, a position of a rack by generating an amount of torque corresponding to the input torque command.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
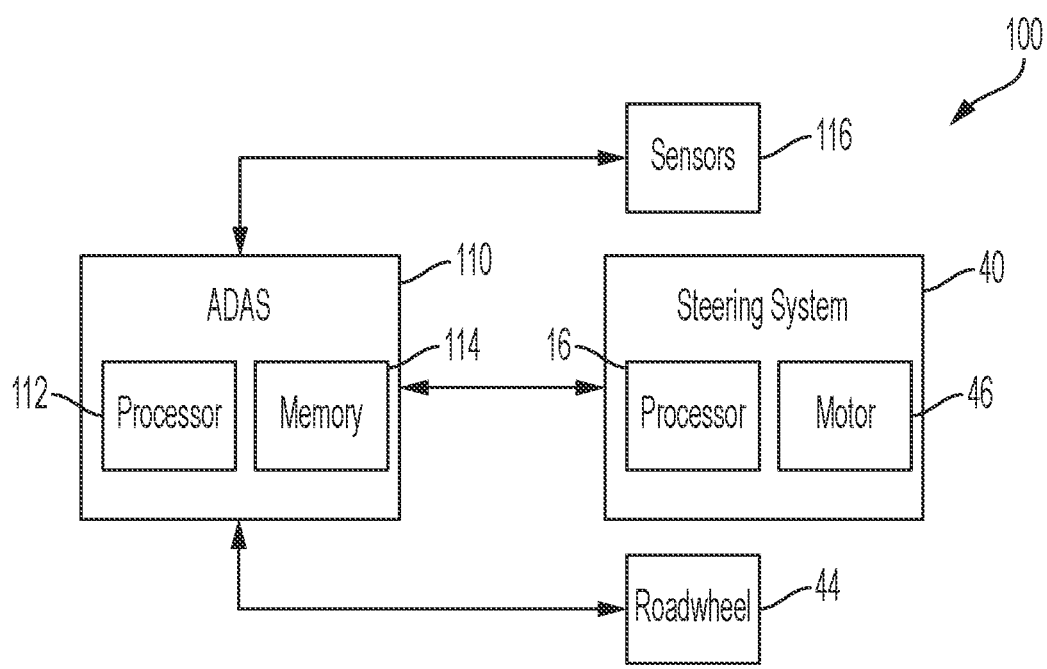
FIG. 1 depicts an advanced driver assistance system in a vehicle according to one or more embodiments.

FIG. 1 depicts an advanced driver assistance system in a vehicle according to one or more embodiments. It will be appreciated that the steering system 40 shown and described can be used in an autonomous or semi-autonomous vehicle or in a more conventional vehicle. In a vehicle 100, an advanced drive assistance system (ADAS) 110 can be coupled with a steering system 40, one or more roadwheels 44 (via one or more control unit), and other control units in the vehicle 100. The ADAS 110 can include one or more processors 112 and one or more memory devices 114.

The ADAS 110 receives one or more input signals including data and/or commands from the control units, such as the controller 16 of the steering system 40. The ADAS 110 can further receive one or more input signals from one or more sensors 116, such as a camera, a radar, a lidar, or any other sensors. The ADAS 110 can further send signals including data and/or commands to the control units, such as a controller 16 of the steering system 40. The ADAS 110 can further receive input from the human driver, such as a destination, one or more preferences and the like.

The ADAS 110 can provide notifications to the driver, such as during an interaction with the driver, and/or in response to one or more conditions in the vehicle 100. The notifications can include audio notifications, visual notifications, haptic notifications, torque notifications, and the like. For example, audio/visual notifications can be sent via a driver-vehicle information unit, speakers equipped in the vehicle 100, and the like. The haptic notifications can be provided via a seat, the steering system 40, and the like. The torque notification can be sent via the steering system 40, for example by generating a torque overlay that is added into an assist torque that is generated for assisting the driver when operating the vehicle 100.

The ADAS 110, in one or more examples, determines a trajectory of travel for the vehicle 100 automatically. The sensors 116 are used to provide several ADAS features that affect lateral motion of the vehicle 100, such as lane keeping assist, lane centering assist, blind-zone assist etc. Such features can help the driver avoid collisions, such as a side-collision, front-collision etc. When providing such functionality, the ADAS 110 assesses the driver's intention, such as acceleration, lane change etc. ADAS features, such as LKA, may rely on sensor-based lane information to detect vehicle proximity to a lane-mark or vehicle's potential to cross into other lane based on lateral movement. However, such information is often delayed with respect to driver input. After the driver applies handwheel torque, there is some delay before vehicle motion is affected, due to physics. For collision avoidance application, such delay is not desirable as it might be too late to predict a potential side collision and apply necessary torque overlay.

Technical solutions described herein facilitate determining a predicted vehicle trajectory faster than sensor based trajectory prediction. For overcome the technical challenges with the sensor based vehicle trajectory prediction, the technical solutions described herein use steering signals, such tbar torque, to predict the vehicle trajectory. The predicted trajectory (or path) can be used to identify the driver's intentions and act, if needed, to mitigate a potential collision (side, front etc.).

Figure 2:
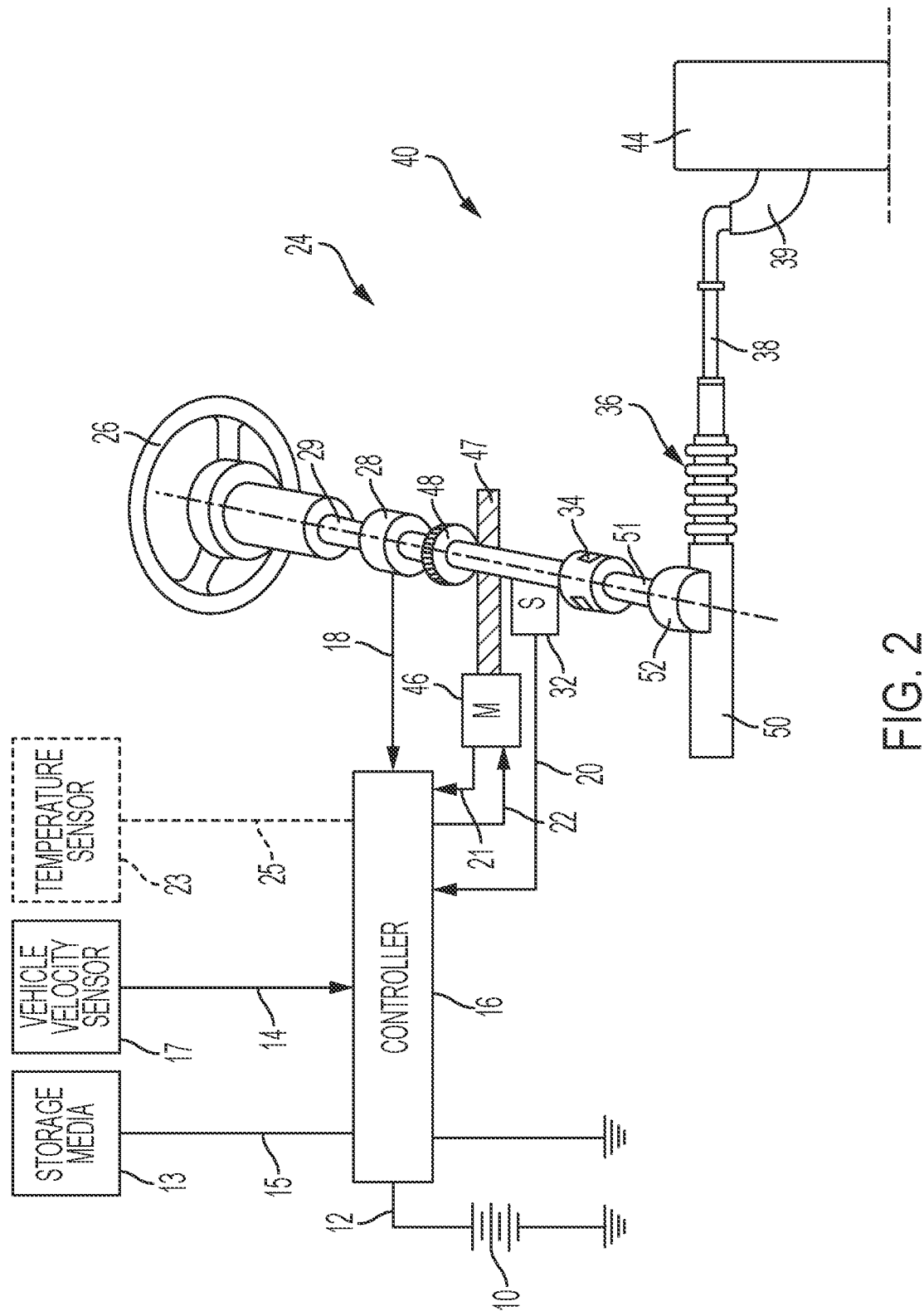
FIG. 2 is an exemplary embodiment of an electric power steering system.
Figure 3:
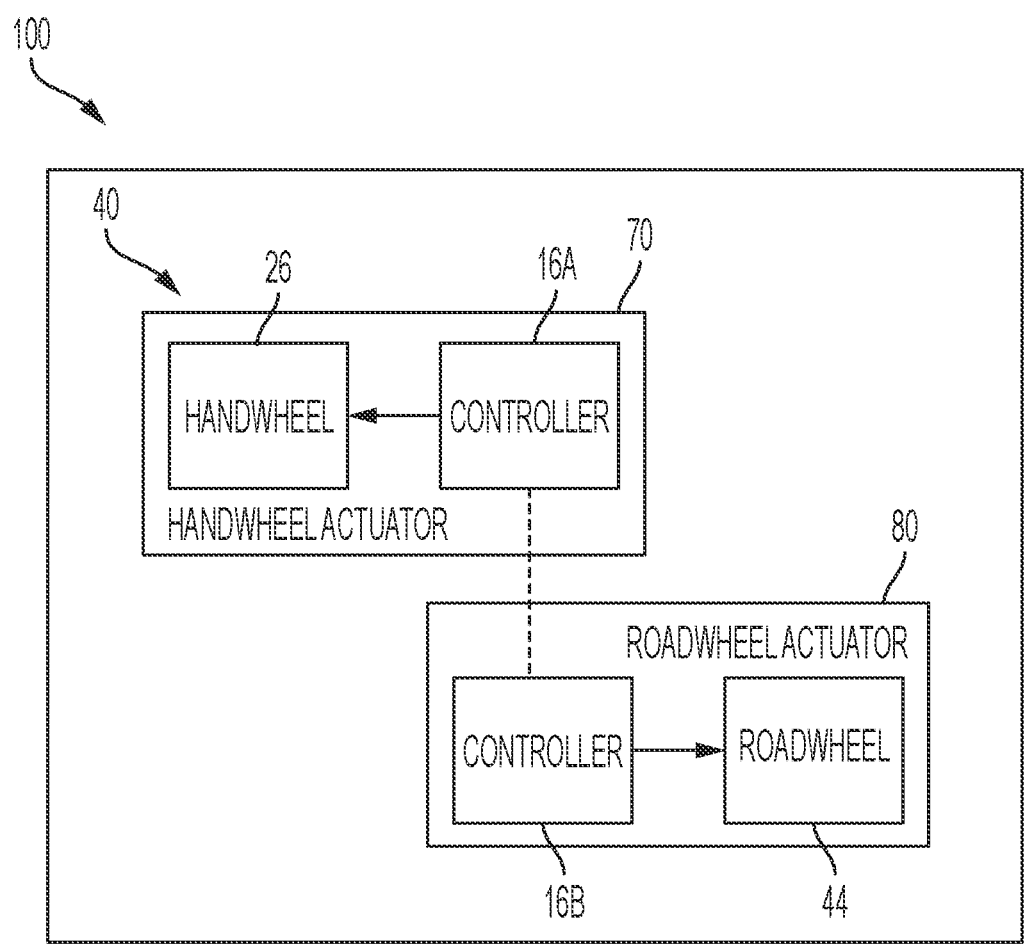
FIG. 3 is an exemplary embodiment of a steer by wire system.

The technical solutions described herein are applicable to both EPS (Electric Power Steering) and SbW (Steer-by-Wire) systems. Referring to the Figures, where the technical solutions will be described with reference to specific embodiments, without limiting same, FIG. 2 is an exemplary embodiment of an electric power steering system (EPS) 40 in a vehicle 100 suitable for implementation of the disclosed embodiments, and FIG. 3 is an exemplary embodiment of a SbW system 40 for implementation of the described embodiments. Unless specifically described otherwise, the present document refers to a steering system 40 that can be either an EPS or a SbW or any other type of steering system in which the technical solutions described herein can be used.

In FIG. 2, the steering mechanism 36 is a rack-and-pinion type system and includes a toothed rack (not shown) within housing 50 and a pinion gear (also not shown) located under gear housing 52. As the driver input, hereinafter denoted as a handwheel or steering wheel 26 is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) or tire(s) 44 (only one shown). Although a rack-and-pinion type system is described herein, the EPS in other embodiments can be a column assist EPS (CEPS), pinion assist EPS (PEPS), dual pinion assist EPS, or any other type of EPS.

Electric power steering assist is provided through the control apparatus generally designated by reference numeral 24 and includes the controller 16 and an electric motor 46, which could be a permanent magnet synchronous motor (PMSM), or a permanent magnet direct current motor (PMDC), or any other type of motor, and is hereinafter denoted as motor 46. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle driver. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the corresponding voltage(s) out of inverter (not shown), which may optionally be incorporated with controller 16 and will be referred to herein as controller 16, such that, when applied to the motor 46, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 46 and the desired torque, the position and/or speed of the rotor and the torque applied by a driver are determined. A position encoder is connected to the steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 may be located at the electric motor 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

FIG. 3 depicts an exemplary SbW system according to one or more embodiments. The SbW system 40 includes a handwheel actuator (HWA) 70 and a roadwheel actuator (RWA) 80. The controller 16 is split into two blocks, a controller 16A and a controller 16B associated with the HWA 70 and the RWA 80 respectively. In other examples, the controller 16 can be distributed in any other manner.

The HWA 70 includes one or more mechanical components, such as the steering wheel 26 (handwheel), a steering column, a motor/inverter attached to the steering column either through a gear mechanism or a direct drive system. The HWA 70 further includes the microcontroller 16A that controls the operation of the mechanical components. The microcontroller 16A receives and/or generates torque via the one or more mechanical components. For example, the microcontroller 16A can send a torque command request to a motor/inverter that will generate such torque.

The RWA 80 includes one or more mechanical components, such as a steering rack coupled to a motor/inverter through a ball-nut/ball-screw (gear) or pinion gear arrangement, and the rack is connected to the vehicle roadwheels/tires 44 through tie-rods. The RWA 80 includes the microcontroller 16B that controls the operation of the mechanical components. The microcontroller 16B receives and/or generates torque via the one or more mechanical components. For example, the microcontroller 16B can send a torque command request to a motor/inverter that will generate such torque.

The microcontrollers 16A and 16B are coupled through electrical connections that allow signals to be transmitted/received. As referred to herein, a controller can include a combination of the HWA controller 16A and the RWA controller 16B, or any one of the specific microcontrollers.

In one or more examples, the controllers 16A and 16B SbW system 40 communicate with each other through CAN interface (or other similar digital communication protocols). Guidance of the vehicle 100 that is fitted with the SbW system 40 is performed by use of the steering gear. The RWA 80 receives an electronic communication signal of rotation of the steering wheel by the driver. A driver controls the steering wheel to directionally control the vehicle 100. The angle from HWA 70 is sent to the RWA 80 which performs position control to control rack travel to guide the roadwheel. However, due to the lack of mechanical connection between the steering wheel and the road wheels, the driver is not readily provided with a feel for the road without torque feedback (unlike the case in an EPS as described earlier).

In one or more examples, the HWA 70 that is coupled to the steering column and steering wheel simulates the driver's feel of the road. The HWA 70 may apply tactile feedback in the form of torque to the steering wheel. The HWA 70 receives a rack force signal from the RWA 80 to generate an appropriate torque feel for the driver. Alternatively, the handwheel angle and vehicle speed can also be used to generate desired torque feel to the driver.

As noted earlier, the SbW and EPS described herein are exemplary, and the technical solutions described herein are applicable to any type of a steering system, and as such, unless specifically mentioned otherwise, a "steering system" herein refers to any type of steering system.

Typically, in steering systems, as an alternative to state feedback (full or partial) with reference feedforward approach, a cascaded control structure with an inner velocity and outer position control loops may be used. Such architectures are used for position control, with general compensators such as PID controllers being used for both loops. Such compensators do not allow for intuitive and easy tuning and further do not always provide a robust disturbance rejection capability. Such technical challenges are addressed by the technical solutions described herein which provide a cascaded control structure with specific compensators for each of the two loops. With this structure, the resulting closed loop position tracking transfer function becomes pure second order (under specific conditions), which makes the response easier and more flexible to tune compared to typical architectures. Further, the technical solutions described herein facilitate the control system to have enhanced disturbance rejection. This makes the overall control structure intuitive to understand and easy to tune while providing significant flexibility for modifying the command tracking and disturbance rejection properties of the overall position control system.

Figure 4:
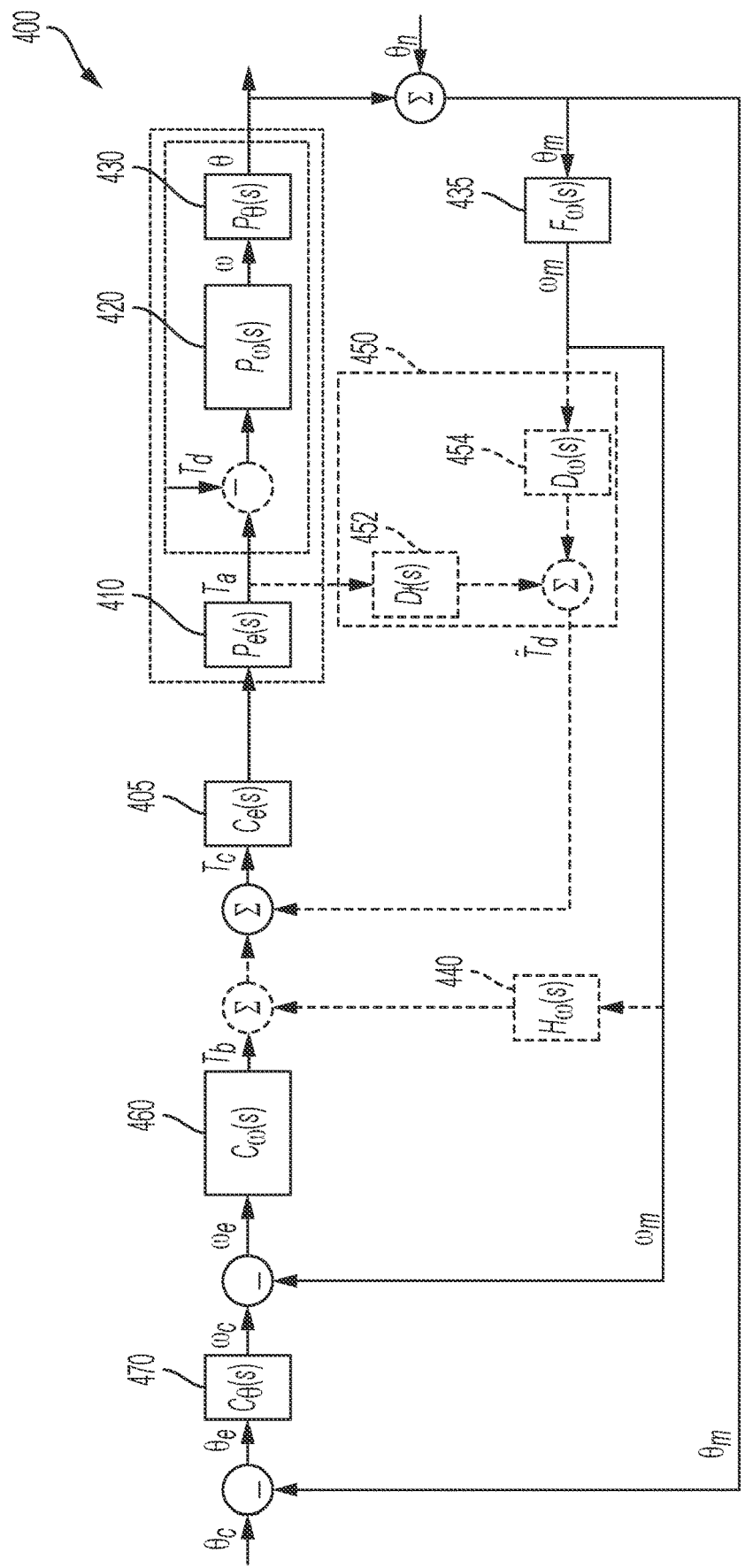
FIG. 4 depicts a cascaded position control architecture of a steering system according to one or more embodiments.

FIG. 4 depicts a block diagram of a cascaded position control system with an inner velocity control loop along with an outer position control loop. In the figure, a steering system plant 400 is shown including a rack-velocity plant 420 and a rack-position plant 430 represented by $P_\omega$ (420) and $P_\theta$ (430) respectively, while the electrical plant 410 of the motor is represented by $P_e$ (410). The electrical and mechanical plants are shown in dotted lines, and the control structure 440 and 450 (which controls the operation of the plants) are not typically included in cascaded position control architectures. It should be noted that because the disturbance feedback ($\tilde{T}_d$) does not change the effective plant as seen from the control signal before its addition, it is not considered for the description presented for selection of the different controller parameters. However, it should be understood that for small plant uncertainty (modeling errors), the closed loop responses remain effectively the same. The transfer functions for the mechanical plants can be represented in terms of the cumulative inertia J and damping b as follows.

$$P_\omega = \frac{1}{Js + b}$$

$$P_\theta = \frac{1}{s}$$

Further, the motor electromagnetic torque controller (405) is modeled by $C_e$. For the foregoing discussion, the electrical (closed-loop) dynamics are ignored, or mathematically it is assumed that $C_e P_e \approx 1$, which is a fair assumption because the electrical torque control loop is tuned to be significantly faster than the mechanical dynamics. This results in the motor torque command being substantially equal to the actual motor electromagnetic torque as follows.

$$T_c \approx T_a$$

Further, the rack force estimator (450) or disturbance estimator is represented by at least two transfer functions $D_t$ (452) and $D_\omega$ (454). The rack force estimate $\tilde{T}_d$ is composed of these two transfer functions and may be mathematically represented as follows.

$$\tilde{T}_d = D_t T_a + D_\omega \omega_m$$

The transfer functions $D_t$ and $D_\omega$ are obtained from a state observer for estimating the rack force ($T_d$), referred to herein as the disturbance. In one or more examples, the rack force estimator 450 includes the disturbance observer that augments the plant matrix with the disturbance (rack force) being modeled as a state with an unknown initial step input. The (augmented) plant equations, in such case, are as follows.

$$\begin{bmatrix} \dot{\omega} \\ \dot{T}_d \end{bmatrix} = \begin{bmatrix} -b/J & -1/J \\ 0 & 0 \end{bmatrix} \begin{bmatrix} \omega \\ T_d \end{bmatrix} + \begin{bmatrix} 1/J \\ 0 \end{bmatrix} [T_a]$$

$$y = Cx$$

$$[\omega] = \begin{bmatrix} 1 & 0 \end{bmatrix} \begin{bmatrix} \omega \\ T_d \end{bmatrix}$$

The observer equations are obtained using estimates of the plant matrices along with observer gains as follows.

$$\dot{\hat{x}} = \hat{A}\hat{x} + \hat{B}u + L(y - \hat{y})$$
$$= \hat{A}\hat{x} + \hat{B}u + L(Cx - \hat{C}\hat{x})$$
$$= (\hat{A} - L\hat{C})\hat{x} + \hat{B}u + LCx$$

$$\begin{bmatrix} \dot{\hat{\omega}} \\ \dot{\hat{T}}_d \end{bmatrix} = \begin{bmatrix} -\hat{b}/\hat{J} - L_1 & -1/\hat{J} \\ -L_2 & 0 \end{bmatrix} \begin{bmatrix} \hat{\omega} \\ \hat{T}_d \end{bmatrix} + \begin{bmatrix} 1/\hat{J} \\ 0 \end{bmatrix} [T_a] + \begin{bmatrix} L_1 & 0 \\ L_2 & 0 \end{bmatrix} \begin{bmatrix} \omega \\ T_d \end{bmatrix}$$

Here $\hat{J}$ and $\hat{b}$ represent estimated or best-known values of cumulative inertia and damping for the system.

Taking the Laplace transform of this matrix equation, the estimated rack force is obtained as follows.

$$\hat{T}_d = \frac{-L_2/\hat{J}}{s^2 + (\hat{b}/\hat{J} + L_1)s - L_2/\hat{J}} T_a + \frac{-L_2(s + \hat{b}/\hat{J})}{s^2 + (\hat{b}/\hat{J} + L_1)s - L_2/\hat{J}} \omega$$
$$= D_t T_a + D_\omega \omega$$

In such cases the observer gains are tuned analytically to achieve specific transfer functions, or by using standard techniques such as pole placement or LQE.

In order to better explain the one or more embodiments described herein with specific closed loop systems, some derivations with simplifying conditions are described at the outset. First, the measured velocity of the motor 46 is obtained as a function of the true velocity and measurement noise as follows.

$$\omega_m = F_\omega \theta_m$$
$$= F_\omega P_\theta \omega + \omega_n$$

Here, $\omega_n$ is considered to be the equivalent velocity measurement (estimation) noise which is a function of the true position measurement noise. The transfer function $F_\omega$ is substantially designed (as much as possible) to be a derivative which compensates the motor-position plant $P_\theta$ while filtering out the noise from the position measurement ($\theta_m$). The position measurement includes the position of the rack, which is based on the input position command ($\beta_c$) along with position noise ($\theta_n$) that can introduced because of several factors. As an example, $F_\omega$ may be designed with a derivative and low pass filter with time constant $\tau_\omega$ as follows.

$$F_\omega = \frac{s}{\tau_\omega s + 1}$$

The velocity responses to different external inputs may be determined as described below, where, $T_b$ is an input torque based on the input position command, $T_c$ is a torque command that is based on $T_b$ and one or more feedback terms. The feedback terms can include a disturbance estimate $\tilde{T}_d$ that is computed by a disturbance estimator 450. The feedback terms can further include an ideal derivative ($H_\omega$) configured to operate a controller 440 and thus an exact inverse of the motor-position plant 430. The equations below further represent as $T_a$, a final torque command generated by the electrical plant 410, and that is applied to the mechanical plant (420 and 430). The disturbance $T_d$ affects this final torque command and in turn the motor velocity and position.

The control system 400 further shows the motor-position controller 470 that determines a motor velocity ($\omega_c$) based on a position error ($\theta_e$). The determined motor velocity can be at which the motor 46 is to be moved. The position error is computed as the difference between the input position command ($\theta_c$) and the measured position of the rack ($\theta_m$). In one or more examples, a velocity error ($\omega_e$) is computed based on a difference between the computed motor velocity ($\omega_c$) and a measured motor velocity ($\omega_m$). The motor velocity error is used to compute the input torque command $T_b$ by a motor-velocity controller 460. The velocity responses to different external inputs may be determined as described below:

$$\omega = P_\omega(T_a - T_d)$$
$$= (1 + P_\omega P_e C_e (C_\omega - H_\omega) F_\omega P_\theta)^{-1} \begin{pmatrix} P_\omega P_e C_e C_\omega \omega_c + \\ P_\omega P_e C_e (H_\omega - C_\omega) F_\omega \theta_n - P_\omega T_d \end{pmatrix}$$
$$= M_{\omega c} \omega_c + M_{\omega n} \theta_n + M_{\omega d} T_d$$

Here, $M_{\omega c}$ is transfer function for tracking the computed motor velocity $\omega_c$; $M_{\omega n}$ is a transfer function for tracking the rack position noise $\theta_n$; and $M_{\omega d}$ is a transfer function for disturbance rejection (disturbance=$T_d$).

The velocity tracking response transfer function $M_{\omega c}$ may be written and manipulated as follows.

$$M_{\omega c} = (1 + P_\omega P_e C_e (C_\omega - H_\omega) F_\omega P_\theta)^{-1} P_\omega P_e C_e C_\omega \omega_c \approx$$
$$(1 + P_\omega (C_\omega - H_\omega) F_\omega P_\theta)^{-1} P_\omega C_\omega \omega_c$$

Here, the electrical control dynamics are assumed to be ideal, i.e., $P_e C_e \approx 1$, because the electrical torque control is typically tuned to be much faster than the mechanical dynamics. Further, $F_\omega$ is assumed to be an ideal derivative, and thus an ideal inverse of the motor-position plant $P_\theta$. This implies that $F_\omega P_\theta \approx 1$. The velocity tracking response transfer function $M_{\omega c}$ then becomes as follows.

$$M_{\omega c} = (1 + P_\omega (C_\omega - H_\omega))^{-1} P_\omega C_\omega$$
$$= (P_\omega^{-1} - H_\omega + C_\omega)^{-1} C_\omega$$

If the term $P_\omega^{-1} - H_\omega$ is assumed to be the inverse of an "effective plant" $P_{\omega e}$, i.e., $P_{\omega e} = (P_\omega^{-1} - H_\omega)^{-1}$ then the closed loop transfer function may be written as follows.

$$M_{\omega c} = (1 + P_{\omega e} C_\omega)^{-1} P_{\omega e} C_\omega$$

Note that this is a transfer function with the effective plant replacing the actual plant. Accordingly, if the state feedback is chosen to be a gain $-b_v$, where $b_v$ is termed "virtual damping", the effective plant becomes as follows.

$$P_{\omega e} = \frac{1}{Js + b + b_v}$$

Further, to obtain an ideal first order velocity closed loop response, a proportional-integral (PI) controller is used as the controller $C_\omega$ 460. The PI controller 460 is configured with gains as functions of the plant parameter and the virtual damping term.

$$C_\omega = K_\omega \left( \hat{J} + \frac{\hat{b} + b_v}{s} \right)$$

Using the PI controller 460 results in the following velocity closed loop response under the assumption of accurate parameter estimates.

$$M_{\omega c} = \frac{K_\omega}{s + K_\omega}$$

Here, the virtual damping value helps in retaining the first order characteristic even under modeling uncertainty which may be understood by inspecting the effective plant transfer function. When $b_v$ is chosen to be sufficiently high, the effective plant becomes $$\approx \frac{1}{b_v}$$

and the compensator becomes $$K_\omega \frac{b_v}{s}$$

and the plant as well as controller parameters do not affect the closed loop response as much because they become negligible as compared to the virtual damping term. The disturbance rejection transfer function may similarly be obtained (under assumption of accurate parameter estimation) as follows.

$$M_{\omega d} = (P_\omega^{-1} - H_\omega + C_\omega)^{-1} \approx \frac{1}{Js + b + b_v} \frac{s}{s + K_\omega}$$

Accordingly, in addition to high bandwidth, virtual damping provides additional flexibility in tuning the disturbance rejection properties of the closed loop system 400. The inclusion of the integrator in the velocity loop results in closed loop step tracking as well as closed loop (plant input) disturbance rejection.

The position closed loop for position tracking is determined next by continuing the derivation from the above derivation.

$$\omega = M_{\omega c} \omega_c + M_{\omega n} \theta_n + M_{\omega d} T_d$$

$$P_\theta^{-1} \theta = M_{\omega c} C_\theta (\theta_c - \theta_m) + M_{\omega n} \theta_n + M_{\omega d} T_d$$

$$\rightarrow \theta = M_{\theta c} \theta_c + M_{\omega d} T_d + M_{\theta n} \theta_n$$

Based on the position tracking transfer function, a proportional (P) controller is used as the position controller $C_\theta$ 470 and configured to have a gain $K_\theta$. Accordingly, the closed loop transfer function becomes as follows (given the above velocity closed loop response above).

$$M_{\theta c} = \frac{K_\omega K_\theta}{s^2 + K_\omega s + K_\omega K_\theta}$$

Hence, the position tracking closed loop has an ideal second order response. The control signal is computed for all external outputs following the same approach described above as follows.

$$T_a = (1 + P_e C_e ((C_\omega - H_\omega) F_\omega + C_\omega C_\theta) P_\theta P_\omega)^{-1}$$
$$(P_e C_e C_\omega C_\theta \theta_c - P_e C_e ((C_\omega - H_\omega) F_\omega + C_\omega C_\theta) P_\theta P_\omega T_d +$$
$$P_e C_e ((C_\omega - H_\omega) F_\omega + C_\omega C_\theta) \theta_n)$$
$$T_a = U_c \theta_c + U_d T_d + U_n \theta_n$$

Figure 5:
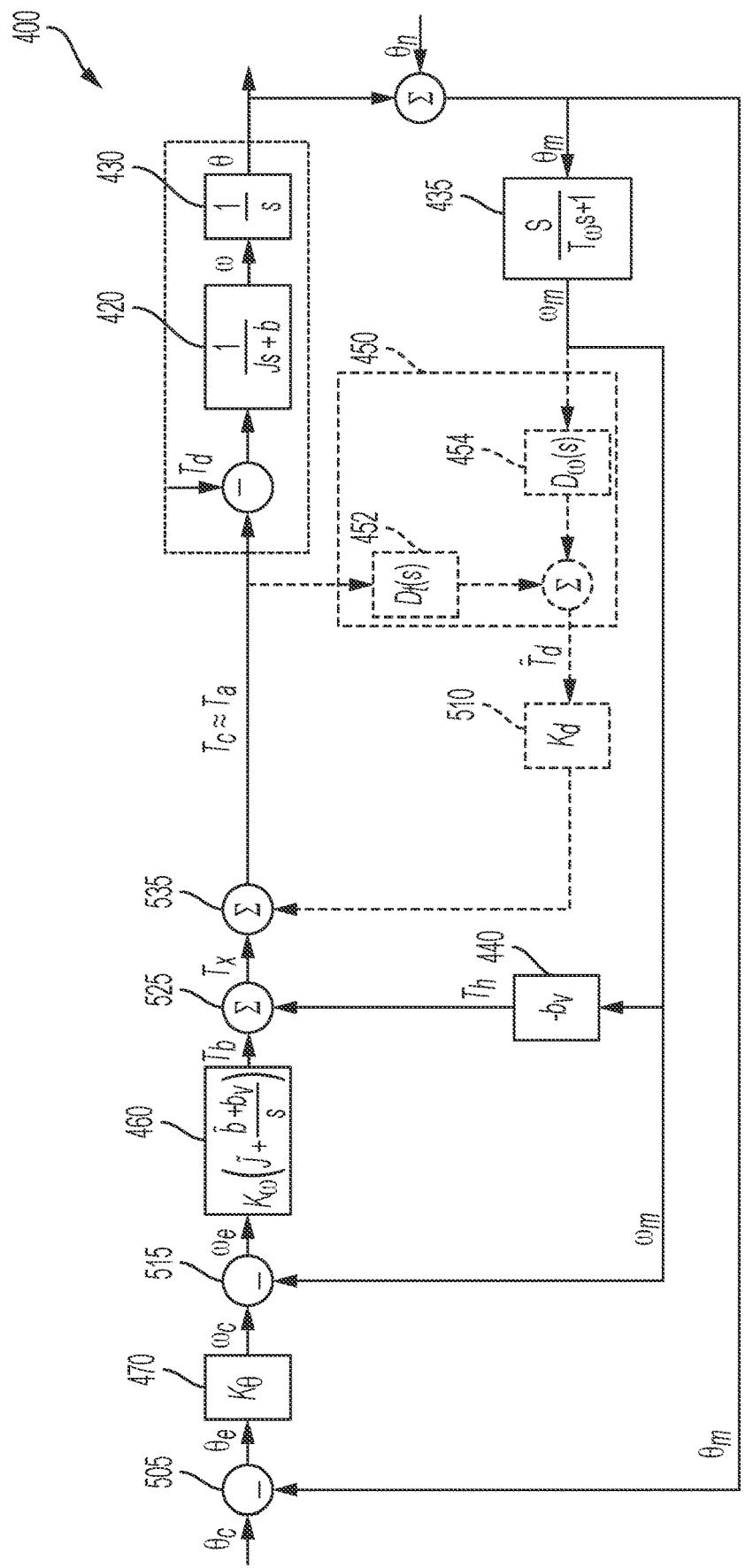
FIG. 5 depicts a cascaded position control architecture of a steering system according to one or more embodiments of the present invention.

FIG. 5 depicts a block diagram of a cascaded position control system according to one or more embodiments. In the depicted block diagram, the electrical plant $P_e$ 410 and the corresponding controller $C_e$ 405, which were considered to be ideal inversions of each other (described herein), are not shown for simplification. Further, a PI controller as the velocity controller 460 is shown in the velocity loop and a P controller as the position controller 470 is shown in the position loop using the transfer functions as described herein.

In one or more examples, for a desired natural frequency $\omega_f$ and damping ratio $\zeta$ the gains of the position controller 470 and velocity controller 460 are configured as follows.

$$K_\omega = 2\zeta \omega_f$$
$$K_\theta = \frac{\omega_f}{2\zeta}$$

The input position command ($\theta_c$) is modified (505) in the position loop. The modification is based on the measured rack position. The modified position command is used by the position controller 470 to generate a velocity command.

The velocity command is adjusted (515) using the measured motor velocity that is fed back in the velocity loop. In one or more examples, the measured velocity is determined as a derivative of the measured rack position. The modified velocity command is used by the velocity controller 460 to generate the input torque command $T_b$ that is to be applied to the mechanical and electrical plants.

The input torque command is modified in the disturbance feedback loop using a disturbance estimate. In one or more examples, the disturbance estimate $\tilde{T}_d$ is scaled using a disturbance controller 510 configured using a gain parameter $K_d$. The output of the disturbance controller 510 is added (535) with the input torque command to generate an adjusted torque command $T_c$. In one or more examples, the input torque command is further modified using the virtual damping controller 440, which is configured to the virtual damping term $b_v$. The output of the virtual damping controller $T_h$ is added (525) in the input torque command to generate a torque command $T_x$. In one or more examples, the torque command $T_x$ can be modified by the disturbance estimate as described above.

Figure 6:
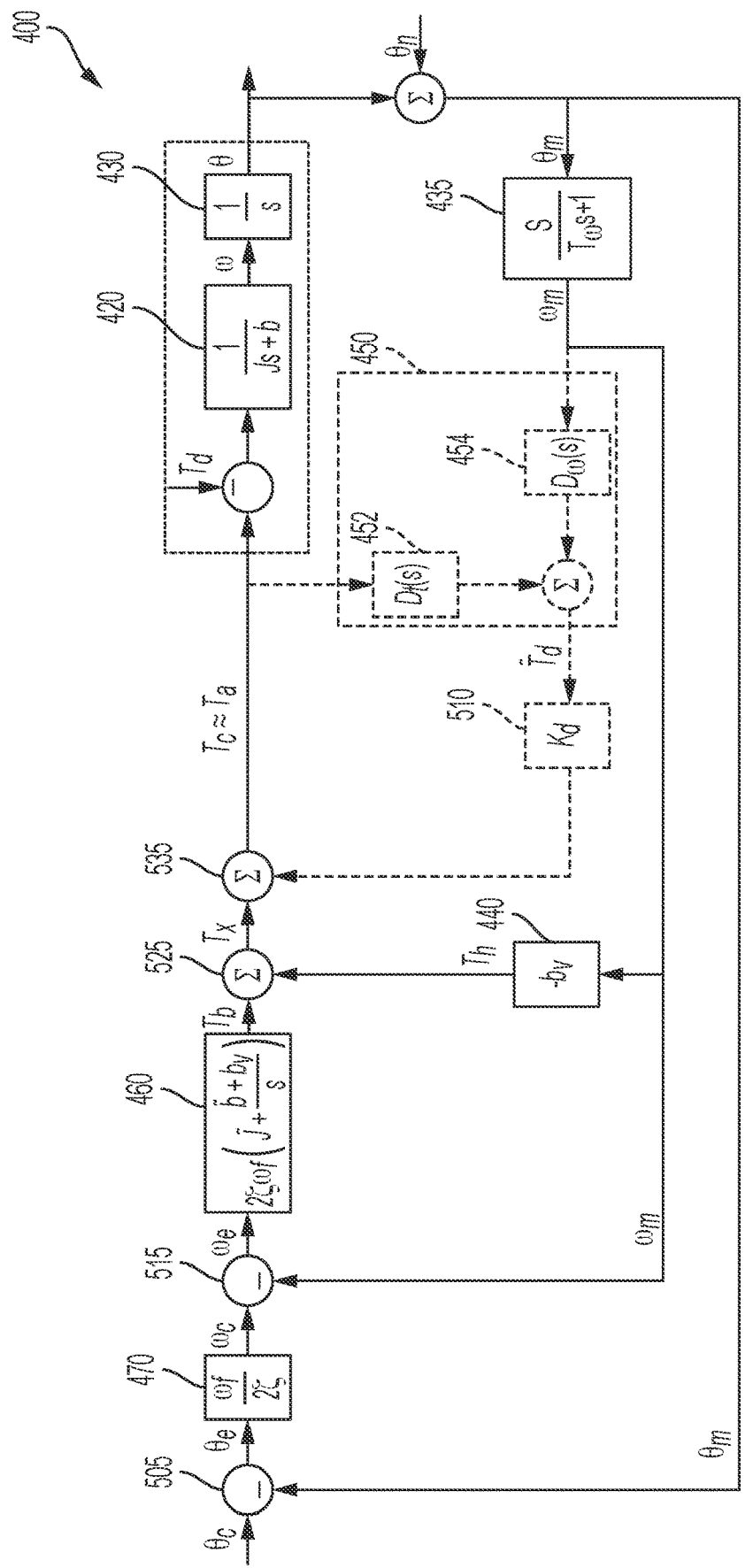
FIG. 6 depicts a cascaded position control architecture of a steering system for second order response according to one or more embodiments of the present invention.

FIG. 6 depicts a block diagram of a cascaded position control system architecture according to one or more embodiments. Here, the selection of gains as described herein is illustrated. With the depicted control architecture, the closed loop is intuitive and easy to tune, and achieves the goals of step command tracking and step disturbance rejection, and has the additional flexibility of improving the disturbance rejection properties independent of command tracking. For example, by tuning the parameters of the position controller 470, the velocity controller 460, and the disturbance controller 510, and the virtual damping controller 440, the system 400 can be tuned to track the input position command in an improved manner.

Test results using the control architecture described herein were collected to check the position output and torque signal responses for the different external inputs (including the position command, rack force disturbance and the position sensor noise) for varying natural frequencies and damping ratios. In the exemplary test results, the bandwidth of the system increased with increasing natural frequencies for a critically damped system. At the same time, the disturbance rejection improved and the noise response deteriorated. With varying damping ratios, the system exhibited expected responses and it was observed that that the system went from being underdamped to critically damped and finally to an overdamped system. The test results also confirmed that the structure provided by the technical solutions described herein facilitate manipulating the disturbance rejection properties of the system independently of the command response.

The technical solutions described herein address technical challenges with steering systems like Steer-by-Wire (SbW) systems that include a position controller road-wheel actuator (RWA). The position control is performed using feedback control architectures such as PID which utilizes a position feedback. Tuning calibrations for such control is usually not very intuitive and lot of tuning efforts are needed in vehicle. Also, it is difficult to explicitly tune PID for robustness to system parameter variation. The technical solutions described herein address the technical challenges by using specific cascaded control architecture that is intuitive and easy to tune because of bandwidth being built in to control parameters. Further, architecture provided by the technical solutions provides robust position tracking against parameter variation.

The cascaded loop control structure uses position and velocity feedback for position tracking. Further, in one or more examples, a virtual damping term is added to tracking command for improving robustness. Further yet, the control loop structure allows control calibrations to be readily determined using system parameters (inertia, damping).

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A system comprising:
   a processor configured to execute instructions that cause the processor to:
   perform, for a roadwheel actuator, position control, wherein instructions for performing the position control, when executed by the processor, further cause the processor to:
      receive an input rack-position command, and a measured rack-position; and
      compute a velocity command based on a difference in the input rack-position command and the measured rack-position; and
   perform, for the roadwheel actuator, velocity control, wherein instructions for performing the velocity control, when executed by the processor, further cause the processor to:
      receive the velocity command, and a measured motor velocity; and
      compute an input torque command based on a difference in the velocity command and the measured motor velocity,
   wherein, the system adjusts a position of a rack of the roadwheel actuator by generating an amount of torque corresponding to applying the input torque command to a motor, and
   wherein performing the position control and performing the velocity control form a cascaded control loop comprising an outer position feedback loop and an inner velocity feedback loop respectively, the cascaded control loop providing rack position tracking.

2. The system of claim 1, wherein the instructions further cause the processor to perform damping control wherein instructions for performing damping control, when executed by the processor, further cause the processor to:
   compute a first torque command by scaling the measured motor velocity using a damping term; and
   modify the input torque command by adding the first torque command into the input torque command for rack position tracking.

3. The system of claim 1, wherein the instructions further cause the processor to perform disturbance control, wherein instructions for performing disturbance control, when executed by the processor, further cause the processor to:
   estimate a rack force acting on the rack; and
   modify the input torque command using the rack force that is estimated.

4. The system of claim 3, wherein the rack force that is estimated is scaled using a configurable parameter.

5. The system of claim 1, wherein the velocity command is computed based on a configurable parameter of the position control.

6. The system of claim 5, wherein performing the position control includes using a proportional controller.

7. The system of claim 1, wherein the input torque command is computed based on a configurable parameter of the velocity control.

8. The system of claim 7, wherein performing the velocity control includes using a proportional-integral controller.

9. A method comprising:
   computing, for a roadwheel actuator and using position control, a velocity command based on a difference in an input rack-position command and a measured rack-position the measured rack-position is provided as a first feedback term;
   computing, for the roadwheel actuator and using velocity control, an input torque command based on a difference in the velocity command and a measured motor velocity, the measured motor velocity is provided as a second feedback term, wherein using the velocity control and the position control forms a cascaded control loop for providing rack position tracking, wherein the cascaded control loop comprises an outer position feedback loop and an inner velocity feedback loop respectively; and
   adjusting, by a motor, a position of a rack of the roadwheel actuator by generating an amount of torque corresponding to the input torque command.

10. The method of claim 1, further comprising:
   computing, using damping control, a first torque command by scaling the measured motor velocity using a damping term; and
   modifying the input torque command by adding the first torque command into the input torque command for rack position tracking.

11. The method of claim 9, wherein the velocity command is computed based on a configurable parameter of the position control.

12. The method of claim 9, wherein using the position control includes a proportional controller.

13. The method of claim 9, wherein the input torque command is computed based on a configurable parameter of the velocity control.

14. The method of claim 9, wherein using the velocity control includes using a proportional-integral controller.

15. A steering system comprising:
a motor;
a rack of a roadwheel actuator; and
a processor configured to perform, for the roadwheel actuator, at least position control and velocity control, the processor is further configured to perform a method for providing a rack position tracking using a cascaded control loop comprising the position control and the velocity control comprising an inner velocity feedback loop and an outer position feedback loop, respectively, the method comprising:
computing, for the roadwheel actuator and using the position control, a velocity command based on a difference in an input rack-position command and a measured rack-position, the measured rack-position is provided as a first feedback term;
computing, for the roadwheel actuator and using the velocity control, an input torque command based on a difference in the velocity command and a measured motor velocity, the measured motor velocity is provided as a second feedback term; and
adjusting, using the motor, a position of the rack of the roadwheel actuator by generating an amount of torque corresponding to the input torque command.

16. The steering system of claim 15, wherein the steering system is a steer by wire system.

17. The steering system of claim 15, wherein the processor is further configured to perform damping control, and the method further comprising:
computing, using the damping control, a first torque command by scaling the measured motor velocity using a damping term; and
modifying the input torque command by adding the first torque command into the input torque command for rack position tracking.

18. The steering system of claim 15, wherein using the position control includes using a proportional controller and wherein the velocity command is computed based on a configurable parameter of the proportional controller.

19. The steering system of claim 15, wherein using the velocity control includes using a proportional-integral controller, and wherein the input torque command is computed based on a configurable parameter of the velocity control.

* * * * *